United States Patent
Lueke et al.

(10) Patent No.: US 9,409,571 B2
(45) Date of Patent: Aug. 9, 2016

(54) METHOD FOR SUPPORTING A TRAFFIC-LIGHT-SEQUENCE ASSISTANT OF A VEHICLE, SAID ASSISTANT DETECTING TRAFFIC LIGHTS

(71) Applicants: Conti Temic microelectronic GmbH, Nuremberg (DE); Continental Teves AG & Co. oHG, Frankfurt (DE)

(72) Inventors: Stefan Lueke, Bad Homburg (DE); Stefan Hegemann, Wangen (DE); Matthias Komar, Frankfurt (DE)

(73) Assignees: Conti Temic microelectronic GmbH, Nuremberg (DE); Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 14/395,940

(22) PCT Filed: Oct. 21, 2013

(86) PCT No.: PCT/DE2013/200241
§ 371 (c)(1),
(2) Date: Oct. 21, 2014

(87) PCT Pub. No.: WO2014/086349
PCT Pub. Date: Jun. 12, 2014

(65) Prior Publication Data
US 2015/0105989 A1 Apr. 16, 2015

(30) Foreign Application Priority Data
Dec. 3, 2012 (DE) .......................... 10 2012 111 740

(51) Int. Cl.
*B60W 30/00* (2006.01)
*B60W 50/14* (2012.01)
(Continued)

(52) U.S. Cl.
CPC *B60W 30/00* (2013.01); *B60T 7/12* (2013.01); *B60T 7/18* (2013.01); *B60W 30/181* (2013.01);
(Continued)

(58) Field of Classification Search
CPC .............. B60W 30/00; B60W 30/181; B60W 30/18109; B60W 50/14; B60T 7/12; B60T 7/18; G06K 9/00825
See application file for complete search history.

(56) References Cited

U.S. PATENT DOCUMENTS 8,134,480 B2 * 3/2012 Onome ............ G08G 1/096716
340/905
8,638,990 B2 * 1/2014 Kudo ................... G06K 9/2054
382/104
(Continued)

FOREIGN PATENT DOCUMENTS

DE 100 40 123 2/2002
DE 102008020728 10/2009
(Continued)

OTHER PUBLICATIONS

International Search Report of the International Searching Authority for International Application PCT/DE2013/200241, mailed Feb. 3, 2014, 3 pages, European Patent Office, HV Rijswijk, Netherlands.
(Continued)

*Primary Examiner* — Nicholas Kiswanto
(74) *Attorney, Agent, or Firm* — W. F. Fasse

(57) ABSTRACT

A method supports a vehicle's traffic-light-sequence assistant system that detects traffic light sequences of a traffic light (11) with a camera (1). According to the method, when the traffic light (11) is detected in the field of view (1a) of the camera (1), a length or an end stopping point (L) of a driving path (W) toward the traffic light (11) is determined by a control unit (3), such that the traffic light will remain within view of the camera when the vehicle drives the determined length along the driving path to the end stopping point, and a control signal (St) concerning the determined length (L) or the end stopping point of the driving path (W) is outputted.

20 Claims, 1 Drawing Sheet

(51) Int. Cl.
*B60T 7/12* (2006.01)
*B60W 30/18* (2012.01)
*B60T 7/18* (2006.01)
*G06K 9/00* (2006.01)

(52) U.S. Cl.
CPC ......... *B60W 30/18109* (2013.01); *B60W 50/14* (2013.01); *G06K 9/00825* (2013.01); *B60W 2420/42* (2013.01); *B60W 2550/22* (2013.01)

(56) References Cited

U.S. PATENT DOCUMENTS

| | | | | |
|---|---|---|---|---|
| 8,862,342 | B2* | 10/2014 | Oguri | B60W 30/143 701/1 |
| 9,158,980 | B1* | 10/2015 | Ferguson | G06K 9/00825 |
| 2009/0303077 | A1 | 12/2009 | Onome et al. | |
| 2010/0033571 | A1 | 2/2010 | Fujita et al. | |
| 2010/0100268 | A1* | 4/2010 | Zhang | B60W 30/09 701/25 |
| 2011/0307122 | A1* | 12/2011 | Kanning | B60W 30/18072 701/1 |
| 2012/0166083 | A1 | 6/2012 | Okabe et al. | |
| 2013/0253754 | A1* | 9/2013 | Ferguson | G05D 1/0231 701/28 |
| 2014/0046567 | A1 | 2/2014 | Schuler | |
| 2014/0309903 | A1* | 10/2014 | Otake | G08G 1/166 701/70 |

FOREIGN PATENT DOCUMENTS

| | | |
|---|---|---|
| DE | 102009040252 | 3/2011 |
| DE | 102010052964 | 5/2012 |
| DE | 102010063006 | 6/2012 |
| EP | 2 472 229 | 7/2012 |
| GB | 2 486 559 | 6/2012 |

OTHER PUBLICATIONS

PCT Written Opinion of the International Searching Authority for International Application PCT/DE2013/200241 (in German), mailed Feb. 3, 2014, 6 pages, European Patent Office, Muenchen, Germany.

German Search Report for German Patent Application No. 10 2012 111 740.3, dated Jul. 2, 2013, 5 pages, Muenchen, Germany, with English translation, 5 pages.

Moises Diaz-Cabrera et al., "Suspended Traffic Lights Detection and Distance Estimation Using Color Features", 15$^{th}$ International IEEE Conference on Intelligent Transportation Systems, Sep. 16-19, 2012, Anchorage, Alaska, USA, pp. 1315 to 1320.

PCT International Preliminary Report on Patentability including English Translation of PCT Written Opinion of the International Searching Authority for International Application PCT/DE2013/200241, issued Jun. 9, 2015, 9 pages, International Bureau of WIPO, Geneva, Switzerland.

* cited by examiner

METHOD FOR SUPPORTING A TRAFFIC-LIGHT-SEQUENCE ASSISTANT OF A VEHICLE, SAID ASSISTANT DETECTING TRAFFIC LIGHTS

FIELD OF THE INVENTION

The invention relates to a method for supporting a traffic-light-sequence assistant of a vehicle, said assistant detecting the traffic light sequences of traffic lights by means of a camera.

BACKGROUND INFORMATION

A driver assistance device having a camera for detecting the red phase of a set of traffic lights is known from DE 10 2010 052 964 A1. When such an object is detected, the vehicle is recuperatively slowed down depending on the detected traffic light sequences until the vehicle stops at a stop line in front of the traffic lights.

A prerequisite for the above is, however, that the traffic lights must be within the visual range of the camera all the time. This particularly applies to assistance functions that act from vehicle stoppage, such as the automatic starting of the drive motor of the vehicle when the traffic lights switch from red to green.

SUMMARY OF THE INVENTION

Starting from this prior art, the object of the invention is to create a method for supporting a traffic-light-sequence assistant of a vehicle, said assistant detecting the traffic light sequences of traffic lights by means of a camera, said method ensuring the operativeness of said assistant in as many traffic situations as possible.

The above object can be achieved by a method according to at least one embodiment of the invention as set forth herein.

According to an embodiment of the invention, such a method for supporting a traffic-light-sequence assistant of a vehicle, which detects the traffic light sequences of traffic lights by means of a camera of the vehicle, is characterized in that
when a traffic light is detected in the visual range or field of view of the camera, the length of a driving path or a stopping point along a road in the direction toward the traffic light is determined by a control unit, such that said driving path will keep the traffic light in the visual range or field of view of the camera, i.e. such that the traffic light will remain in the field of view of the camera when the vehicle drives the determined length along the driving path to the stopping point; and
a control signal concerning the length of the driving path is outputted.

The control signal indicating the length of the driving path is preferably outputted to an indicating device of the vehicle.

The indicating device produces a visual and/or acoustic indication of the end of the driving path, which indication can be used to inform the driver.

This enables the driver to stop his or her vehicle at an indicated stopping point or stop line in order to ensure the operativeness of the traffic-light-sequence assistant.

In an advantageous realization of the invention, the visual and/or acoustic indication is in the form of an indication of distance indicated in a unit of measurement of length. Alternatively or additionally, the visual and/or acoustic indication may be in the form of a visual and/or acoustic pictograph.

According to a further realization of the invention, it is particularly advantageous if the control signal indicating the length of the driving path is outputted to an assistance system intervening in the brake system of the vehicle and if the assistance system is designed to take over the end of the driving path as the stopping point to be reached in a targeted braking maneuver and to support the driver in this targeted braking maneuver to stop at the stopping point.

In a preferred embodiment, the control signal concerning the length of the driving path is outputted to an automatic vehicle control system. In particular, the automatic vehicle control system may be a Full Speed Range ACC system, a Stop&Go ACC system, an ACC (Adaptive Cruise Control) system, an emergency braking assistance system, or a complete automatic lateral and longitudinal control system of the vehicle, which automatically controls the vehicle such that the vehicle will stop at the end of the driving path, i.e., the end of the driving path is particularly taken over as the stopping point to be reached in a targeted braking maneuver and the vehicle is automatically slowed down such that it will reach said stopping point.

Advantageously, the automatic vehicle control system may inform the driver about a visual and/or acoustic indication so that the driver will be able to understand automatic vehicle control more easily and will not be surprised at the possible occurrence of a gap left by his or her vehicle relative to a vehicle stopping in front thereof.

In order to prevent the end of the driving path (the stop position of the vehicle) from being too long a distance before the traffic lights, a further realization of the invention suggests detecting the stop line of the traffic lights by means of the camera and determining the length of the driving path such that the distance between the end of the driving path and the stop line will not exceed a predetermined distance.

In a further realization of the invention, the geometric position and the distance between the traffic lights and the vehicle are determined by means of a 3D camera in order to determine the length of the driving path.

An alternative further development provides that for determining the length of the driving path, the distance to the traffic lights is estimated by analyzing the image data of a mono camera by means of 3D scene construction. For determining the length of the driving path, it is also possible to estimate the distance to the traffic lights by analyzing the image data of a mono camera with respect to the angle change of the traffic lights in the image data.

BRIEF DESCRIPTION OF THE DRAWINGS

In the following, the invention will be described in detail on the basis of exemplary embodiments and with reference to the attached figures, in which.

DETAILED DESCRIPTION OF AN EXAMPLE EMBODIMENT OF THE INVENTION

Figure 1:
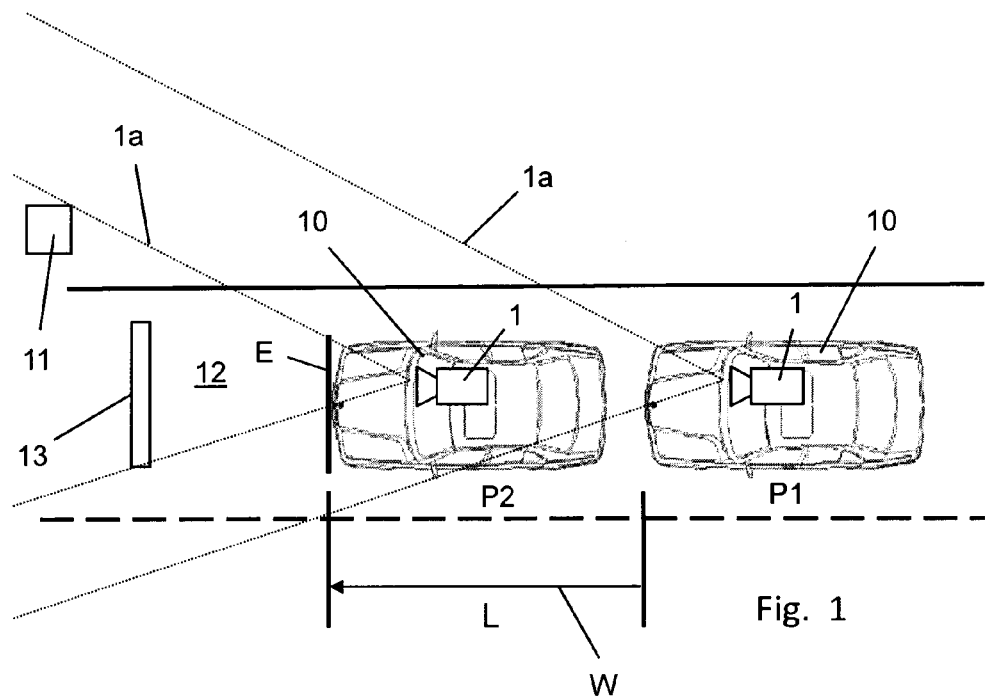
FIG. 1 shows a schematic representation of a traffic situation with a vehicle having a traffic-light-sequence assistance system in front of traffic lights for explaining the inventive method.
Figure 2:
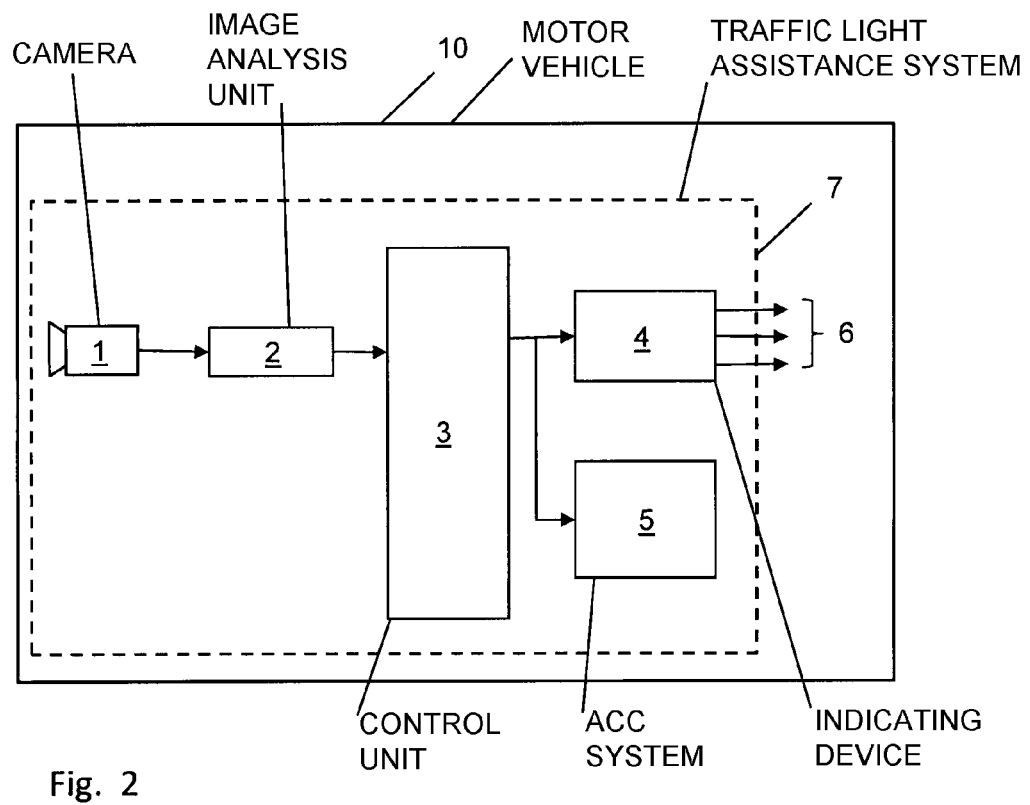
FIG. 2 shows a schematic block diagram of a vehicle having a traffic-light-sequence assistant for carrying out the inventive method.

FIG. 1 shows a situation in front of traffic lights 11. A vehicle, e.g., a motor vehicle 10 having a traffic-light-sequence assistance system 7, driving on a traffic lane 12 of a road is heading toward said traffic lights 11. This traffic-lightsequence assistance system 7 has a camera 1 (stereo camera or mono camera) with a visual range or field of view 1a. The camera image data from this visual range or field of view 1a are supplied to an image analysis unit 2 according to FIG. 2. For example, the traffic lights 11 according to FIG. 1 are recognized by means of an object recognition software in the image analysis unit 2.

According to FIG. 1, the vehicle 10 is heading toward the traffic lights 11, wherein it is at first in a position P1. In this position P1, the traffic lights 11 are recognized by the camera 1 and the geographical position of the traffic lights 11 and the distance between the traffic lights 11 and the vehicle 10 are determined or estimated from the image data and these data are supplied to a control unit 3 (cf. FIG. 2). When a red phase is detected, the vehicle 10 must stop in front of a stop line 13 in front of the traffic lights 11. Therefore, the control unit 3 calculates from these data a driving path W having a length L so that the traffic lights 11 will remain within the field of view 1a of the camera 1 over this driving path W until the end E thereof which is thus taken as a stopping point for the vehicle 10. The control unit 3 generates a control signal St indicating this length L of the driving path W or the position of the stopping point at the end E of the driving path W. Said control signal St is supplied to an indicating device 4 of the vehicle 10.

The indicating device 4 generates a visual and/or acoustic indication on the basis of this control signal St, said indication indicating to the driver the stopping point at the end E of the driving path W where the vehicle 10 is to be stopped in order to maintain the operativeness of the traffic-light-sequence assistant 7 of the vehicle 10, i.e., to ensure that the traffic lights 11 are still within the field of view 1a of the camera 1 when the vehicle 10 is stopped at the stopping point at the end E of the driving path W, i.e., in position P2 according to FIG. 1. From the position P2 of the vehicle 10, the traffic light assistance system 7 can act when the phase of the traffic lights 11 changes, e.g. to green, and thus the system 7 can perform its corresponding functions.

If the driver of the vehicle 10 acts according to this indication, the vehicle will be prevented from stopping too close to the traffic lights 11, and thereby the traffic lights 11 will be prevented from leaving the field of view 1a of the camera 1.

The indicating device 4 may indicate the end E of the driving path W visually by continuously indicating the current distance to the end E of the driving path W (remaining distance to the end E indicated in meters) or by corresponding voice output.

Alternatively or additionally, the driving path W or the end E of this driving path W may be indicated to the driver by means of a visual and/or acoustic pictograph and using the indicating device 4. For example, the pictorial representation of a virtual stop line on a display of the indicating device 4 is a suitable visual pictograph, said virtual stop line corresponding to the end E of the driving path W. For example, an audio signal having a decreasing pitch may be used as an acoustic pictograph.

If the vehicle 10 additionally has an assistance system intervening in the brake system, e.g., an ACC (Adaptive Cruise Control) system (see reference numeral 5 in FIG. 2), the control signal St indicating the length L of the driving path W is supplied to this ACC system 5 as well.

This ACC system takes over the end E of the driving path W as the point to be reached in a targeted braking maneuver and supports the driver in successfully performing this targeted braking maneuver. To this end, the ACC system 5 is connected to appropriate actuators 6 (e.g., brake actuators). If the ACC system 5 is already in a braking mode, the vehicle 10 can be automatically slowed down (by means of appropriate brake actuators 6) such that it will reach said point.

In order to prevent the end E of the driving path W (the stop position of the vehicle 10 corresponding to position P2) from being too long a distance before the traffic lights 11, the stop line 13 of the traffic lights 11 is detected by means of the camera 1 and the length L of the driving path W is determined such that the distance between the end of the driving path W and the stop line 13 will not exceed a predetermined distance (e.g., 5 m) in order to prevent the distances between the position P2 of the vehicle 10 and the traffic lights 11 from being too long.

Depending on the camera system used for the camera 1, the position of the traffic lights 11 and the distance between the traffic lights 11 and the vehicle 10 may be determined in various ways.

For example, the position of the traffic lights 11 and the distance can be directly determined/measured on the basis of the image data when a stereo camera is used as a 3D camera.

The inventive traffic-light-sequence assistant may also be realized by means of a mono camera used as the camera 1. To this end, the determination of the position of the traffic lights 11 and the estimation of the length L of the driving path W and of the distance to the traffic lights 11 are performed by means of 3D scene construction known in the prior art.

For determining the length L of the driving path W, it is also possible to estimate the distance to the traffic lights by analyzing the image data of the mono camera 1 with respect to the angle change of the traffic lights in the image data.

REFERENCE NUMERALS 1 camera, mono camera, stereo camera
1a visual range of camera 1
2 image analysis unit
3 control unit
4 indicating device
5 ACC system
6 actuators of ACC system
7 traffic-light-sequence assistance system
10 vehicle
11 traffic lights
12 traffic lane
13 stop line of traffic lights 11
E end of driving path W
L length of driving path W
W driving path of vehicle 10
P1 position of vehicle 10
P2 position of vehicle 10

The invention claimed is:

1. A method for supporting a traffic-light-sequence assistant of a subject vehicle, wherein said assistant detects traffic light sequences of a traffic light with a camera, characterized in that:
   when the traffic light is detected in a field of view of the camera, a control unit determines a length or an end stopping point of a driving path along a road toward the traffic light such that the traffic light will remain in the field of view of the camera when the vehicle drives the determined length or to the end stopping point along the driving path, and
   the control unit outputs a control signal concerning the length or the end stopping point of the driving path.

2. The method according to claim 1, characterized in that the control signal is outputted to an indicating device of the vehicle, and the indicating device produces a visual and/or acoustic indication of the end stopping point of the driving path.

3. The method according to claim 2, characterized in that the visual and/or acoustic indication comprises an indication of distance in length units as a measurement of the length of the driving path.

4. The method according to claim 1, characterized in that the control signal is outputted to a braking assistance system that intervenes in a brake system of the vehicle, and the assistance system is configured and arranged to take over the end stopping point of the driving path as a point to be reached by the vehicle when it stops by a targeted braking maneuver, and the braking assistance system supports a driver of the vehicle in the targeted braking maneuver.

5. The method according to claim 1, characterized in that the control signal is outputted to an automatic vehicle control system that controls the vehicle such that the vehicle will stop at the end stopping point of the driving path.

6. The method according to claim 5, characterized in that the automatic vehicle control system informs a driver of the vehicle with a visual and/or acoustic indication.

7. The method according to claim 1, characterized in that on the road there is a stop line associated with the traffic light, the stop line is detected by the camera, and the length or the end stopping point of the driving path is determined such that a remaining distance between the end stopping point of the driving path and the stop line will not exceed a predetermined distance.

8. The method according to claim 1, characterized in that the camera is a 3D camera, and a geometric position and a distance between the traffic light and the vehicle are determined by the 3D camera to determine the length of the driving path.

9. The method according to claim 1, characterized in that the camera is a mono camera, and for determining the length of the driving path, a distance to the traffic light is estimated by analyzing image data of the mono camera by 3D scene construction.

10. The method according to claim 1, characterized in that the camera is a mono camera, and for determining the length of the driving path, a distance to the traffic light is estimated by analyzing image data of the mono camera with respect to an angle change of the traffic light in the image data.

11. The method according to claim 1, wherein the control unit determines the length of the driving path, and outputs the control signal concerning the length.

12. The method according to claim 1, wherein the control unit determines the end stopping point of the driving path, and outputs the control signal concerning the end stopping point.

13. The method according to claim 1, wherein the control unit determines the length or the end stopping point of the driving path as a farthest travel of the vehicle toward the traffic light such that the traffic light will remain in the field of view of the camera.

14. The method according to claim 1, wherein a leading vehicle is stopped at the traffic light in front of the subject vehicle, and based on the length or the end stopping point, the driving path ends at a gap spacing distance behind the leading vehicle larger than a usual spacing distance between vehicles queuing up behind a red traffic light.

15. The method according to claim 1, wherein on the road there is a stop line associated with the traffic light, and based on the length or the end stopping point, the driving path ends at a gap spacing distance before reaching the stop line.

16. A method of automatically evaluating a phase of a traffic light comprising steps:
    a) with a camera of a subject vehicle that is driving on a road, capturing camera images of a traffic light;
    b) in an image analysis unit of the vehicle, evaluating the camera images to detect the traffic light and a signal phase thereof;
    c) when the signal phase is detected as a red light phase, further evaluating the camera images and in consideration thereof, with a control unit of the vehicle determining a maximum travel distance or a farthest stopping point along the road at which the vehicle would have to stop to ensure that the traffic light will remain in view of the camera;
    d) with the control unit, producing a control signal dependent on and indicative of the maximum travel distance or the farthest stopping point; and
    e) in response to the control signal, either outputting a warning to a driver of the vehicle with an indicating device of the vehicle, or controlling a braking assistance system or an autonomous brake control system of the vehicle.

17. The method according to claim 16, wherein the step c) comprises the determining of the maximum travel distance.

18. The method according to claim 16, wherein the step c) comprises the determining of the farthest stopping point.

19. The method according to claim 16, wherein a lead vehicle is stopped at the traffic light in front of the subject vehicle, and the maximum travel distance or the farthest stopping point ends at a gap spacing distance behind the leading vehicle larger than a usual spacing distance between vehicles queuing up behind a red traffic light.

20. The method according to claim 16, wherein on the road there is a stop line associated with the traffic light, and the maximum travel distance or the farthest stopping point ends at a gap spacing distance before reaching the stop line.

* * * * *